United States Patent [19]

Martin et al.

[11] Patent Number: 5,212,944
[45] Date of Patent: May 25, 1993

[54] CARBON AND SILICONE POLYMER ABLATIVE LINER MATERIAL

[75] Inventors: Jon W. Martin, Los Alamitos; Richard A. Griese, Redlands, both of Calif.

[73] Assignee: TRW Inc., Redondo Beach, Calif.

[21] Appl. No.: 602,438

[22] Filed: Oct. 23, 1990

[51] Int. Cl.$^5$ .................... F02K 9/00; C08F 8/00
[52] U.S. Cl. ...................... 60/253; 239/DIG. 19; 525/105
[58] Field of Search ............ 60/253, 271, 205, 39.02; 239/DIG. 19; 524/506; 525/105, 106

[56] References Cited

U.S. PATENT DOCUMENTS

| | | | |
|---|---|---|---|
| 3,268,359 | 8/1966 | Boyd et al. | 117/132 |
| 3,623,904 | 11/1971 | Ramseyer | 117/135.1 |
| 3,855,176 | 12/1974 | Skidmore | 60/253 |
| 3,857,825 | 12/1974 | Streck et al. | 525/105 |
| 3,909,481 | 9/1975 | Pike | 260/37 N |
| 3,913,666 | 10/1975 | Bayliss | 165/106 |
| 3,931,093 | 1/1976 | Del Nero | 260/33.6 UA |
| 3,973,397 | 8/1976 | Chase et al. | 60/253 |
| 3,993,711 | 11/1976 | Watson | 260/874 |
| 4,001,475 | 1/1977 | Chambers et al. | 428/175 |
| 4,031,059 | 6/1977 | Strauss | 260/37 SB |
| 4,031,605 | 6/1977 | Couch et al. | 29/460 |
| 4,063,684 | 12/1977 | O'Brien et al. | 239/265.11 |
| 4,084,781 | 4/1978 | Couch et al. | 249/83 |
| 4,144,218 | 3/1979 | French | 260/32.6 R |
| 4,458,595 | 7/1984 | Gerrish, Jr. et al. | 102/290 |
| 4,595,714 | 6/1986 | McAllister et al. | 523/179 |
| 4,663,065 | 5/1987 | Herring | 60/253 |
| 4,686,128 | 8/1987 | Gentilman | 428/44 |
| 4,778,871 | 10/1988 | Newhouse et al. | 528/18 |
| 4,900,779 | 2/1990 | Leibfried | 524/862 |
| 4,935,479 | 6/1990 | Lau et al. | 528/27 |
| 4,977,228 | 12/1990 | Wakabayashi et al. | 525/105 |

*Primary Examiner*—Richard A. Bertsch
*Assistant Examiner*—Michael I. Kocharov
*Attorney, Agent, or Firm*—James M. Steinberger; Sol L. Goldstein

[57] ABSTRACT

A polymeric ablative liner material based on carbon and silicone polymers and particulate fillers which is tailored to control the endothermic chemical reaction and thereby optimize the ablation process to provide maximum cooling and remaining char. The ablative liner material includes hydrocarbon polymers and has a molar ratio of carbon to silicon within the range of about 2 to 8. This composition optimizes the generation of gases for transpirational cooling, the cooling resulting from the endothermic chemical reaction, and the amount of stable char that remains after the ablation process is completed.

18 Claims, 2 Drawing Sheets

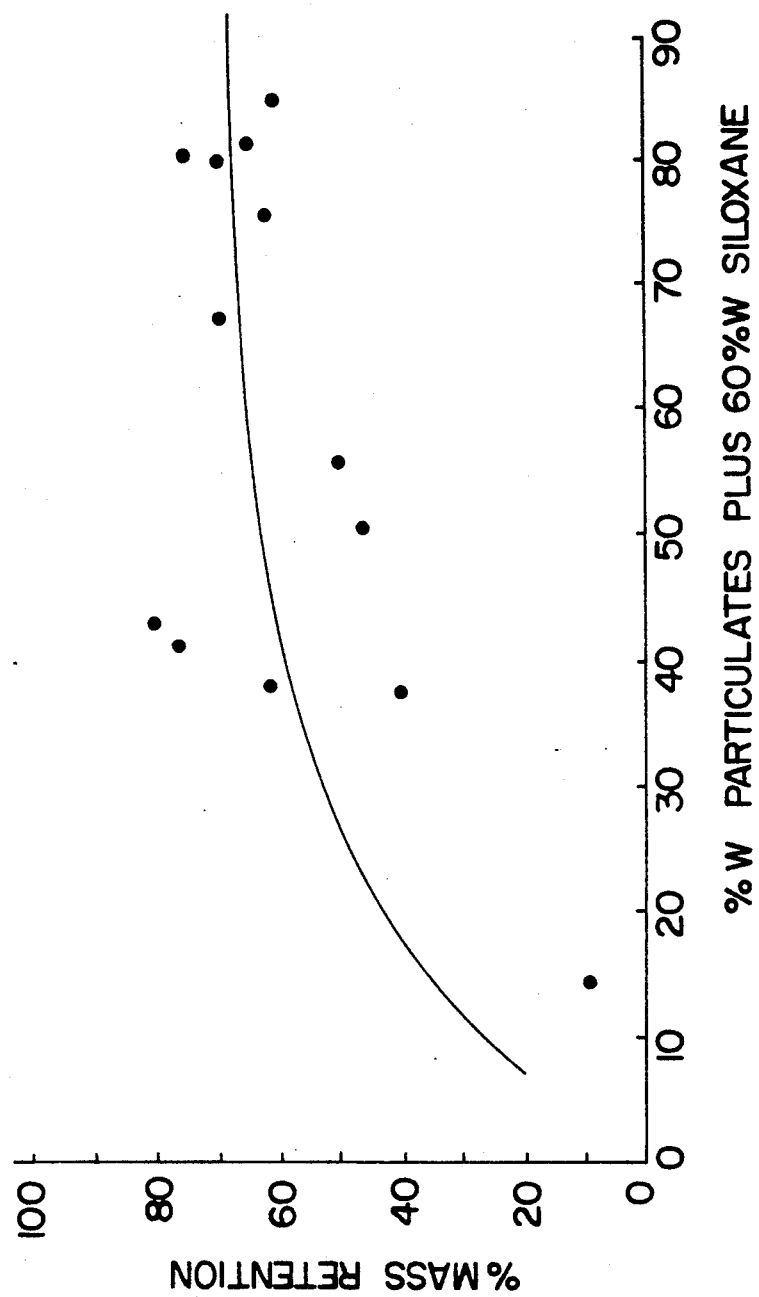

CARBON AND SILICONE POLYMER ABLATIVE LINER MATERIAL

BACKGROUND OF THE INVENTION

This invention relates generally to ablative liner materials and, more particularly, to polymeric ablative liner materials for rocket combustion chambers and expansion nozzles.

Rocket combustion chambers and expansion nozzles, especially those used in liquid oxygen-hydrogen propulsion systems, must withstand high temperature gases which sometimes exceed 3000 degrees C. Three general approaches are typically used for protecting the inner walls of these propulsion systems. The first approach is regenerative cooling, a process in which the liquid propellant provides cooling for the walls of the combustion chamber and expansion nozzle. The second approach utilizes a machined metal liner of some exotic refractory metal, such as columbium, to protect the inner walls of the combustion chamber and expansion nozzle. However, both of these approaches are very costly.

The third approach is the use of an ablative liner. One common type of ablative liner is a machined composite liner, such as a silica phenolic composite, which fits inside the combustion chamber and expansion nozzle. However, machined composite liners require numerous fabrication steps and are subject to severe cracking because of their stiffness. Another common type of ablative liner is a semi-liquid formable polymeric liner which is applied to the inner walls and cured in place. This is the most desirable type of ablative liner because it is low cost, easy to fabricate and resists severe cracking.

Many types of polymeric ablative liners are available, but those based on silicone polymers are particularly attractive. However, none of the presently available polymeric ablative liners has been tailored to optimize the ablation process for liquid-propellant rocket engines. Ablation involves an endothermic chemical reaction in which the liner material is thermally degraded in a controlled manner to produce gases and a porous residue or char of glasses and carbon having a low thermal conductivity. The heat required to sustain the endothermic chemical reaction and the generation of gases provides the cooling. The residue or char that remains after the chemical reaction is completed also provides an insulating barrier for protecting the combustion chamber and expansion nozzle during the latter stages of combustion. These properties of the endothermic chemical reaction, the amount and type of gas generated by the chemical reaction and the amount and stability of the char, must be optimized to provide the greatest degree of protection for liquid-propellant combustion chambers and expansion nozzles. The present invention is directed to this end.

SUMMARY OF THE INVENTION

The present invention resides in a polymeric ablative liner material based on carbon and silicone polymers and fillers which is tailored to control the endothermic chemical reaction and thereby optimize the ablation process to provide maximum cooling and remaining char. The ablative liner material includes hydrocarbon polymers and has a molar ratio of carbon to silicon within the range of about 2 to 8. This composition optimizes the generation of gases for transpirational cooling, the cooling resulting from the endothermic chemical reaction, and the amount of stable char that remains after the ablation process is completed.

It will be appreciated from the foregoing that the present invention represents a significant advance in the field of ablative liner materials. Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 2 is a graph of % mass retention as a function of % weight of particulate filler for 13 samples tested in the oxygen-hydrogen torch tests.

DETAILED DESCRIPTION OF THE PREFERRED EMBODIMENTS

Figure 1:
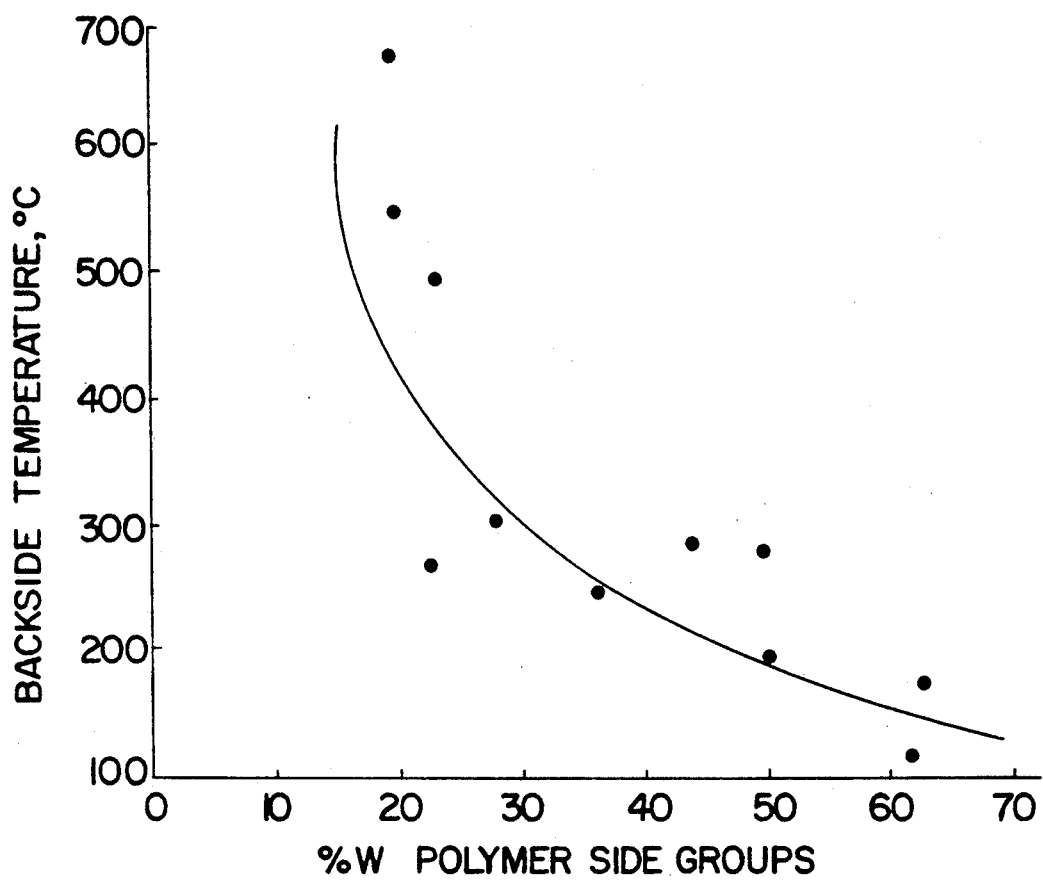
FIG. 1 is a graph of backside temperature as a function of % weight of polymer side groups for 11 samples tested in the oxygen-hydrogen torch tests.

As shown in the drawings for purposes of illustration, the present invention is embodied in a polymeric ablative liner material based on carbon and silicone polymers and particulate fillers which is tailored to control the endothermic chemical reaction and thereby optimize the ablation process to provide maximum cooling and remaining char. The ablative liner material includes hydrocarbon polymers and has a molar ratio of carbon to silicon within the range of about 2 to 8. This composition optimizes the generation of gases for transpirational cooling, the cooling resulting from the endothermic chemical reaction, and the amount of stable char that remains after the ablation process is completed.

Various compositions of carbon and silicone polymers and fillers were investigated to determine the optimum carbon to silicone ratio for low backside temperature, erosion resistance and appearance. Polymers and fillers of silicon and carbon each react differently and generate different amounts and types of gases and leave different amounts and types of residue. The compositions were also varied to control the rheological properties of the semi-liquid materials for ease of application to the inner walls of the combustion chamber and expansion nozzle. For example, the concentration, particle size and structure of the particulate filler materials affect the low shear viscosity of the formulated material. Low shear viscosity is important since it controls the amount of distortion that results after the coating is applied but before it is cured. Addition of liquid oligomers, such as siloxanes, silanes and low-molecular-weight butadiene also affect viscosity.

Laser heating tests were conducted at 3000 degrees C on various mixtures of carbon and silicone polymers and fillers to determine their ablation properties. From these tests it was determined that the sources of carbon, whether from a polymer, a polymer side group or a particulate filler, and the sources of silicon, whether from a polymer or particulate filler, have a significant impact on backside temperatures and erosion rates. High molar ratios of carbon to silicon had low backside temperatures but higher erosion rates, while low molar ratios of carbon to silicon had low erosion rates but high backside temperatures. Too much gas formation caused excessive erosion and too little gas formation caused high backside temperatures. Therefore, carbon to silicon ratios in the range of about 2 to 8 optimized the trade off between backside temperature and erosion.

X-ray diffraction and X-ray dispersive techniques were then used to identify selected char products. Samples based on room temperature vulcanizing (RTV) silicone polymers generated hexagonal silicon carbide, with the source of the carbon being the hydrocarbon side groups (R) attached to the silicon in the siloxane backbone of the silicone polymer.

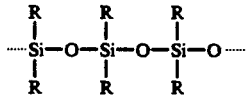

Examples of suitable hydrocarbons for side groups include methyl, phenyl and vinyl radicals, but the methyl radicals ($CH_3$) were preferred.

Samples based on ethylene-propylene-diene hydrocarbon rubber (EPDM) mixed with silicone rubber produced silicon carbide, whereas the silicone rubber by itself produced no crystalline products. Therefore, it was determined that the most likely chemical reaction to occur in these samples during the 3000 degrees C laser tests was:

$$SiO_2 + 3C \rightarrow SiC + 2CO + 137,000 \text{ calories.}$$

This reaction is desirable because it produces high melting silicon carbide and two moles of carbon monoxide for transpirational cooling. It is also desirable because it is highly endothermic (137,000 calories). A subsequent reaction is possible between silicon carbide and excess silica:

$$SiC + 2SiO_2 \rightarrow 3SiO + CO + 304,000 \text{ calories}$$

Other possible reactions between silica and carbon are:

$$SiO_2 + C \rightarrow SiO + CO + 147,000 \text{ calories}$$

$$SiO_2 + 2C \rightarrow Si + 2CO + 157,000 \text{ calories}$$

Therefore, the laser tests showed that the amount of carbon side groups provided by the hydrocarbon polymers must be adjusted to get the desired erosion rates and resulting char.

The laser tests also showed that the silicon and carbon could be mixed together as a single polymer or was preferably mixed together as two polymers to get the molecules as close as possible to form the silicon carbide (SiC) of the resulting char. Otherwise, the ablation process would form CO and $SiO_2$. Therefore, particle size and mixing was very important in the proper operation of these ablative liners.

Oxygen-hydrogen torch tests were then conducted to simulate liquid oxygen-hydrogen engine temperatures and erosion conditions. Various samples similar to those tested during the laser tests were investigated. The torch tests included the additional factor of erosion induced by a 4900 ft/sec gas flow and showed that in addition to the C/Si molar ratio, the formulation of the ablative liner material was also important. The tests simulated thrust chamber conditions at 200 psig with an oxidizer-to-fuel ratio by weight of 6.6. Temperature was about 2900 degrees C and exposure time was 3 minutes.

Of all the variables tested in the torch tests, the use of EPDM hydrocarbon and silicone polymers as the continuous phase was found to be the most important. Side temperatures with EPDM polymers averaged about 192 degrees C while side temperatures with silicone polymers averaged about 338 degrees C. However, silicone polymers provided an average erosion weight loss of only 32% while EPDM polymers provided a weight loss of 50.3%. Therefore, EPDM polymers generate more cooling gases, such as methane, carbon monoxide, and carbon dioxide, while silicone polymers provide a higher char yield, such as silicon monoxide and silicon carbide.

Addition of a low-molecular-weight 1,2-polybutadiene resin, another hydrocarbon polymer, was also found to be important in minimizing side temperatures and in reducing erosion loss. Therefore, it was determined that the use of hydrocarbon polymers was important because of their high surface to volume ratios when compared to particulate fillers, providing more access for the chemical reaction between carbon and silicon.

Addition of a glass or Nextel ceramic fiber filler coated with a polysilane (a precursor of silicon carbide) was also important for both cooling and erosion resistance. Nextel ceramic fabric is a high temperature material (melting point 1700 degrees C) that is useful as a polymer carrier. Nextel ceramic fiber is manufactured by the 3M Corporation and has a composition of 62% aluminum oxide, 14% boron oxide, and 24% silicon dioxide. Fiberglass helped reduce erosion loss, but had little effect on cooling. The glass and Nextel fiber cloths were studied because the polymer materials could also be applied to a fabric to form a two-sided tape, which would then be wound into the chamber shape and bonded either directly, by further vulcanization, or indirectly, by adhesives to the chamber walls.

The various samples were then ranked according to appearance, side temperature and erosion loss. Six samples were rated better than a widely-used prior art ablative liner material DC 93-104 manufactured by Dow Corning. These compositions are shown as parts by weight in Table 1. DC 93-104 has a C/Si ratio of 1.44. The lowest backside temperature of any sample was 500 degrees C below the prior art sample after three minutes and the best erosion rate was less than half that of the prior art sample.

From these results, it was determined that the optimum formulation is 105 parts by weight of RTV silicone rubber, 30 parts by weight of carbon black filler, 25 parts by weight of Nextel fibers, and 20 parts by weight of low-molecular-weight 1,2-polybutadiene. The Nextel fibers should be approximately ¼ inch in length and completely coated with polysilane. The specific gravity of the composition is 1.07 g/cc and the carbon to silicon mole ratio is 4.4. Another good formulation is 80 parts by weight of EPDM, 20 parts by weight of DC-55 silicone rubber, 50 parts by weight of silicon dioxide, 15 parts by weight of fiberglass coated with 10 parts by weight of polysilane, and 5 parts by weight of low-molecular-weight 1,2-polybutadiene. Specific gravity of this formulation is 1.17 g/cc and a carbon to silicon mole ratio of 4.2. This formulation has better mechanical properties than the optimum composition, but must be peroxide cured.

FIG. 1 is a graph of the backside temperature of eleven of the samples as a function of the percentage by weight of the carbon side groups in the carbon and silicone polymers. The graph shows that increasing the amount of the carbon side groups decreases the backside temperature. The eleven samples include those samples having between 33% and 61% filler. FIG. 2 is a graph of the percentage mass of the remaining char for all thirteen of the samples as a function of percentage weight of particulate filler plus the 60% by weight of the backbone portion of the siloxane polymer.

TABLE 1

| | SAMPLE NUMBER | | | | | |
|---|---|---|---|---|---|---|
| | 1 | 2 | 3 | 4 | 5 | 6 |
| HC Rubber | — | — | 100 | 100 | 100 | — |
| HC Resin | 15 | 15 | — | 15 | 15 | — |
| Si Rubber #1 | 100 | 100 | — | — | — | 100 |
| Si Rubber #2 | — | — | 200 | — | — | — |
| FEF Carbon | 10 | 90 | — | — | — | — |
| Chopped carbon | — | 15 | — | — | 15 | — |
| Cab-O-Sil M-5 | — | — | — | 90 | 30 | 30 |
| Nextel fabric | 15 | 15 | — | — | — | — |
| Glass fabric | — | — | — | 15 | 15 | 15 |
| Polysilane | 10 | 10 | — | 10 | 10 | — |
| Di-Cup R | — | — | 2.5 | 2.5 | 2.5 | — |
| Total Weight | 150 | 245 | 302.5 | 232.5 | 187.5 | 145 |
| C/Si mole ratio (calculated) | 3.0 | 7.9 | 2.6 | 4.9 | 13.5 | 1.4 |

HC Rubber - Nordel 1040 hydrocarbon rubber manufactured by DuPont Corporation
HC Resin - low-molecular-weight 1,2-polybutadiene resin
Si Rubber #1 - DC-615 RTV silicone rubber manufactured by Dow Corning Corporation
Si Rubber #2 - DC-55U silicone rubber manufactured by Dow Corning Corporation
FEF carbon - ASTM N-550 carbon black
Cab-O-Sil M-5 - pure $SiO_2$ manufactured by Cabot Corporation
Polysilane for coating the Nextel or glass fabric
Di-Cup R - Dicumyl Peroxide Recrystallized manufactured by Hercules Inc.

The ablative liner material of the present invention is mixed at room temperature using a closed mixer, such as a Baker Perkins mixer or Hobart mixer, or a two-roll rubber mill. No solvent is required. The liner material is then applied by simple methods, such as spraying or troweling, as a semi-liquid or paste material to a surface and cure bonded in place. Two possible methods are available for curing the material. One method is to heat the material in the presence of a peroxide curing agent, with some pressure at 275 to 350 degrees F for 10 to 30 minutes. The other method is to allow the mixture, after mixing in a silane curing agent, to cure at room temperature for a period of about 8 to 12 hours.

The ablative liner material of the present invention is a low cost ablative liner having good processability and manufacturability and excellent reliability and heat resistance. Although the ablative liner material has been described as a liner for use with liquid-propellant thrust chambers and expansion nozzles, other uses include protection of reentry vehicles and launch facilities.

From the foregoing, it will be appreciated that the present invention represents a significant advance in the field of ablative liner materials. Although several preferred embodiments of the invention have been shown and described, it will be apparent that other adaptations and modifications can be made without departing from the spirit and scope of the invention. Accordingly, the invention is not to be limited, except as by the following claims.

We claim:

1. A method for protecting a surface from heat, comprising the step of forming an ablative liner material on the surface, the ablative liner material including:
   a carbon polymer having a backbone of carbon atoms; and
   a silicone polymer;
   wherein the carbon and silicone polymers are selected to provide a molar ratio of carbon to silicon in the range of approximately 2 to 8, thus controlling the endothermic reaction during the ablation process to optimize the generation of gases for transpirational cooling and the amount of stable char that remains after the ablation process is complete.

2. The method as set forth in claim 1, wherein the carbon polymer is a hydrocarbon polymer selected from the group consisting of ethylene-propylene-diene hydrocarbon rubber (EPDM), 1,2 polybutadiene resin, 1,4-polybutadiene resin, ethylene-propylene, and polyethylene.

3. The method as set forth in claim 1, wherein the silicone polymer is a siloxane.

4. The method as set forth in claim 1 wherein the silicone polymer is a silicone rubber.

5. The method as set forth in claim 1, wherein the liner material further includes one or more carbon fillers.

6. The method as set forth in claim 1, wherein the liner material further includes one or more silicon fillers.

7. An ablative liner material for protecting a surface from heat, comprising:
   a carbon polymer having a backbone of carbon atoms; and
   a silicone polymer;
   wherein the carbon and silicone polymers are selected to provide a molar ratio of carbon to silicon in the range of approximately 2 to 8, thus controlling the endothermic reaction during the ablation process to optimize the generation of gases for transpirational cooling and the amount of stable char that remains after the ablation process is complete.

8. The ablative liner material as set forth in claim 7, wherein the carbon polymer is a hydrocarbon polymer selected from the group consisting of ethylene-propylene-diene hydrocarbon rubber (EPDM), 1,2 polybutadiene resin, 1,4-polybutadiene resin, ethylene-propylene, and polyethylene.

9. The ablative liner material as set forth in claim 7, wherein the silicone polymer is a siloxane.

10. The ablative liner material as set forth in claim 7, wherein the silicone polymer is a silicone rubber.

11. The ablative liner material as set forth in claim 7, and further including one or more carbon fillers.

12. The ablative liner material as set forth in claim 7, and further including one or more silicon fillers.

13. A rocket engine having a combustion chamber and expansion nozzle lined with an ablative material, the ablative material comprising:
   a carbon polymer having a backbone of carbon atoms; and
   a silicone polymer;
   wherein the carbon and silicone polymers are selected to provide a molar ratio of carbon to silicon in the range of approximately 2 to 8, thus controlling the endothermic reaction during the ablation process to optimize the generation of gases for transpirational cooling and the amount of stable char that remains after the ablation process is complete.

14. The rocket engine as set forth in claim 13, wherein the carbon polymer is a hydrocarbon polymer selected from the group consisting of ethylene-propylene-diene hydrocarbon rubber (EPDM), 1,2 polybutadiene resin, 1,4-polybutadiene resin, ethylene-propylene, and polyethylene.

15. The rocket engine as set forth in claim 13, wherein the silicone polymer is a siloxane.

16. The rocket engine as set forth in claim 13, wherein the silicone polymer is a silicone rubber.

17. The rocket engine as set forth in claim 13, and further including one or more carbon fillers.

18. The rocket engine as set forth in claim 13, and further including one or more silicon fillers.

* * * * *